(12) United States Patent
Bastholm

(10) Patent No.: US 9,484,827 B2
(45) Date of Patent: Nov. 1, 2016

(54) POWER SUPPLY WITH OUTPUT RECTIFIER

(75) Inventor: Jeppe Christian Bastholm, Sønderborg (DK)

(73) Assignee: Linak A/S, Nordborg (DK)

(*) Notice: Subject to any disclaimer, the term of this patent is extended or adjusted under 35 U.S.C. 154(b) by 4 days.

(21) Appl. No.: 14/127,034

(22) PCT Filed: Jul. 2, 2012

(86) PCT No.: PCT/DK2012/000078
§ 371 (c)(1),
(2), (4) Date: Dec. 17, 2013

(87) PCT Pub. No.: WO2013/004232
PCT Pub. Date: Jan. 10, 2013

(65) Prior Publication Data
US 2014/0126244 A1    May 8, 2014

(30) Foreign Application Priority Data

Jul. 1, 2011  (DK) ................................ 2011 00496

(51) Int. Cl.
*H02M 3/335*    (2006.01)
(52) U.S. Cl.
CPC ..... *H02M 3/33553* (2013.01); *H02M 3/33569* (2013.01)
(58) Field of Classification Search
CPC ........... H02M 3/335; H02M 3/33507; H02M 3/33569
USPC ...... 363/16, 17, 20, 21.01, 21.02, 21.03, 97, 363/131
See application file for complete search history.

(56) References Cited

U.S. PATENT DOCUMENTS

| | | | | |
|---|---|---|---|---|
| 4,559,590 A | * | 12/1985 | Davidson | 363/21.02 |
| 5,719,754 A | * | 2/1998 | Fraidlin et al. | 363/17 |
| 6,038,142 A | * | 3/2000 | Fraidlin et al. | 363/17 |
| 6,058,026 A | * | 5/2000 | Rozman | 363/16 |
| 6,081,432 A | | 6/2000 | Rinne et al. | |
| 6,388,899 B1 | | 5/2002 | Suenaga et al. | |
| 6,545,883 B2 | * | 4/2003 | Xing et al. | 363/21.11 |
| 6,646,895 B1 | | 11/2003 | Jacobs et al. | |
| 6,856,523 B2 | | 2/2005 | Griffin | |
| 7,066,041 B2 | | 6/2006 | Nielsen | |
| 7,453,303 B2 | | 11/2008 | Cebry et al. | |
| 7,573,731 B2 | * | 8/2009 | Kwon et al. | 363/25 |
| 8,441,812 B2 | | 5/2013 | Ueno et al. | |
| 8,555,431 B2 | | 10/2013 | Nielsen | |
| 2002/0126509 A1 | * | 9/2002 | Liang | 363/16 |

* cited by examiner

*Primary Examiner* — Gary L Laxton
(74) *Attorney, Agent, or Firm* — Dykema Gossett PLLC

(57) ABSTRACT

A power converter for converting power from a first voltage level at an input terminal to a second voltage level across first and second output terminals, the power converter including a first inductor having one end connected to the input terminal and another end connected to a point with a switched voltage level, a first switch element with a first terminal connected to the point and a second terminal connected to ground and a second switch element connected in series with a capacitor through a first terminal, and a second terminal of the second switch element being connected to the point and the capacitor being terminated to ground, the first switch element being operated with a first duty cycle (D), and wherein the second switch element being operated with a second duty cycle (1-D), wherein the first and second switch elements are operated such that their conducting periods are complementary, wherein the switched voltage level at the point includes a first pulse generated when the first switch element conducts and a second pulse generated when the second switch element conducts.

8 Claims, 13 Drawing Sheets

POWER SUPPLY WITH OUTPUT RECTIFIER

FIELD OF THE INVENTION

The present invention relates to a switch mode power supply and a method of converting power.

BACKGROUND OF THE INVENTION

Linear actuator systems are used in various applications and typically comprise one or more electro-mechanical actuators operated by a DC motor, a controller and a power supply. The power supply is a conventional power supply based on a transformer and a rectifier in the form of a rectifier bridge and a capacitor for smoothing the voltage as such power supplies are very robust and reliable. However such power supplies have the disadvantage that they are heavy and voluminous and require a relatively large amount of materials and that the efficiency is about 50-60% at full load.

On the other hand, a switch mode power supply typically has a higher efficiency, typically 80-90% at full load, while the amount of required material is less than a conventional power supply as described above. One of the main reasons for reducing the amount of material is due to the magnetic circuit. In a traditional power supply the step down transformer operates at a frequency of 50 Hz, whereas a switch mode power supply has a magnetic circuit operating at around 30-50 kHz, thus allowing the size of the magnetic circuit to be reduced.

Switch mode power supplies are as such well known and some may refer to known topologies such as: Fly Back, Boost, Buck, SEPIC and Forward, with Fly Back as the most common occurrence. These prior art switch mode power supplies each have their advantages and disadvantages. However, despite the advantages such as the high efficiency switch mode power supplies have for various reasons not gained footing within linear actuator systems, which requires robust and reliable power supplies with a relative high output.

It is noted that the said actuator system is used for various purposes within the industry (machines and process plants, agricultural and construction equipment etc.), furniture (adjustable beds, recliners etc.), hospital and care furniture (hospital and care beds, treatment couches and chairs, patient lifts, wheelchairs etc.), office furniture (hand/stand-up desks etc.), energy (solar tracking etc.) just to mention some field of applications.

As for many other field of applications requiring a direct current power supply, there is a demand for systems which can operate worldwide without having to change components or mechanical switches in respect of the actual voltage level such as 110 VAC/230 VAC at a given location.

SUMMARY OF THE INVENTION

It may be seen as an object of the invention to provide an improved power converter which also could be used in linear actuator systems. Preferably, the invention alleviates, mitigates or eliminates one or more of the above or other disadvantages singly or in any combination.

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an aspect, the present invention relates to a power converter for converting power from a first voltage level at an input terminal to a second voltage level between a first and a second output terminal, said power converter comprising,
- a first inductor, with one end connected to the input terminal and another end connected to a point with a switched voltage level,
- a first switch element with a first terminal connected to said point and a second terminal connected to ground and
- a second switch element connected in series with a capacitor through a first terminal and a second terminal of the second switch element being connected to said point and said capacitor being terminated to ground, wherein the first switch element is arranged for being operated with a first duty cycle (D) and wherein the second switch element is arranged for being operated with a second duty cycle (1-D), wherein the first and second switch element is arranged to operated such that their conducting periods are complementary, wherein the switched voltage level at said point comprises a first pulse generated when the first switch element conducts and a second pulse generated when the second switch element conducts,
- a magnetic coupled circuit arranged to transform the switched voltage at said point through a primary inductor to a secondary inductor, a first end of said secondary inductor being connected to a first and second diode, said diodes having opposite polarity, wherein the first diode is arranged to rectify the first pulse and the second diode is arranged to rectify the second pulse, and
- a series connected output capacitor with a common point being connected between the first and second output terminals, the output of the first diode being connected to the first output terminal, the output of the second diode being connected to the second output terminal and the second end of the secondary inductor being connected to said common point.

Thus an improved power converter is provided. It may be seen as an advantage of the power converter that, in the present embodiment, both switches operate at zero voltage switching but without being in a resonance state. The zero voltage switching reduces the switching losses. A further advantage may be seen to be that the diodes D1, D2 in the secondary circuit are only exposed to low voltage, as the capacitor C2 clamps the voltage and protects the system against high voltage spikes.

It may also be seen as an advantage that the forward topology reduces the need for magnetic materials, as the transformer does not function as an energy reservoir, but that energy is delivered as soon as it arrives. This leads to reduced ripple current on the primary side, which among others, improves the EMC performance.

According to one embodiment of the invention the voltage level at the output terminals is regulated by adjusting the first and second duty cycles.

An advantage of this embodiment is that a simple output voltage control is provided.

According to one embodiment of the invention, the first and second duty cycles are adjusted according to the first voltage level at the input terminal, so as to keep a constant second voltage between the output terminals.

An advantage of this embodiment may be seen to be that the power converter provides a simple control system for maintaining a constant output at different input voltage levels.

According to one embodiment of the invention, the power converter comprises an AC to DC rectifier and a smoothing capacitor connected to the input terminal.

An advantage of this embodiment may be seen to be that the power converter can be connected directly to an AC supply grid.

According to one embodiment of the invention, the first switch element comprises a first diode connected in parallel and the second switch element further comprises a second diode connected in parallel.

An advantage of this embodiment may be seen to be that a path for the current is provided during dead time periods between the two switch elements M1 and M2.

According to one embodiment of the invention the first inductor and the primary inductor are implemented as one common component.

An advantage of this embodiment may be seen to be that with a power converter where the inductor and the primary inductor/winding of the transformer is one common component, there is no DC component in the current and thus the magnetic coupled circuit does not require an air gap in the core of the transformer. Whereas for a design with a separate inductor and transformer the inductor needs a core with an air gap in order to handle the DC component without saturating the core.

According to an embodiment, the invention comprises an actuator system including a power converter according to the invention.

An advantage of this embodiment may be seen to be that it provides an actuator system with a power supply with high efficiency and a universal voltage input meaning that the actuator can be connected to an electrical supply grid worldwide.

In a second aspect, the present invention relates to a method of converting power in a power converter from a first voltage level at an input terminal to a second voltage level at a first and second output terminal, said method comprising operating a first switch with a first duty cycle (D) and
operating a second switch with a second duty cycle (1-D)
  wherein the first and second switch elements are operated such that their conducting periods are complementary, and
generating a switched voltage when current flows in a first inductor, consisting of a first pulse when the first switch element conducts and generating a second pulse when the second switch conducts,
transforming the switched voltage through a magnetic coupled circuit with a primary inductor to a secondary inductor, and
rectifying the first pulse through a first diode and rectifying the second pulse through a second diode.

The advantages of the second aspect and its embodiments may be seen to be equivalent to the advantages of the first aspect of the present invention.

The individual aspects of the present invention may each be combined with any of the other aspects. These and other aspects of the invention will be apparent from and elucidated in the following description with reference to the described embodiments.

Any of the attendant features will be more readily appreciated as the same become better understood by reference to the following detailed description considered in connection with the accompanying drawings. The preferred features may be combined as appropriate, as would be apparent to a skilled person and may be combined with any of the aspects of the invention.

Embodiments of the invention will now be further described with reference to the accompanying drawings.

BRIEF DESCRIPTION OF THE FIGURES

The power converter and actuator with a power converter according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

The power supply of the present invention can be used to supply an actuator system of the type which can be used for adjusting a hospital bed or a care bed. In such type of beds, the mattress is carried by a support surface having an adjustable backrest and leg rest section, said support surface being mounted in a bed frame which may be raised and lowered by means of linear actuators in the actuator system. Further, the backrest and leg rest sections of the bed may be adjusted by means of linear actuators. Normally, a type of linear actuator comprising a thrust rod, e.g. of the type described in WO 02/29284 A1 Linak A/S is used.

This type of linear actuator comprises a spindle with a spindle nut. The spindle is driven by a reversible electric motor through a transmission. When the spindle is driven, the spindle nut is moved in an inwards or outwards direction depending on the direction of rotation of the electric motor. The linear actuator is a separate product with the spindle, transmission and electric motor enclosed in a housing. The housing typically consists of a motor housing and an outer tube. An inner tube is secured to the spindle nut. The inner tube is displaced in and out of the outer tube as the spindle nut is moved in and out on the spindle. In the opposite end of the spindle nut the inner tube comprises a front mounting. The outer side of the motor housing is furnished with a rear mounting. The front mounting and rear mounting are used to secure the linear actuator in the structure which should be adjusted.

Figure 1:
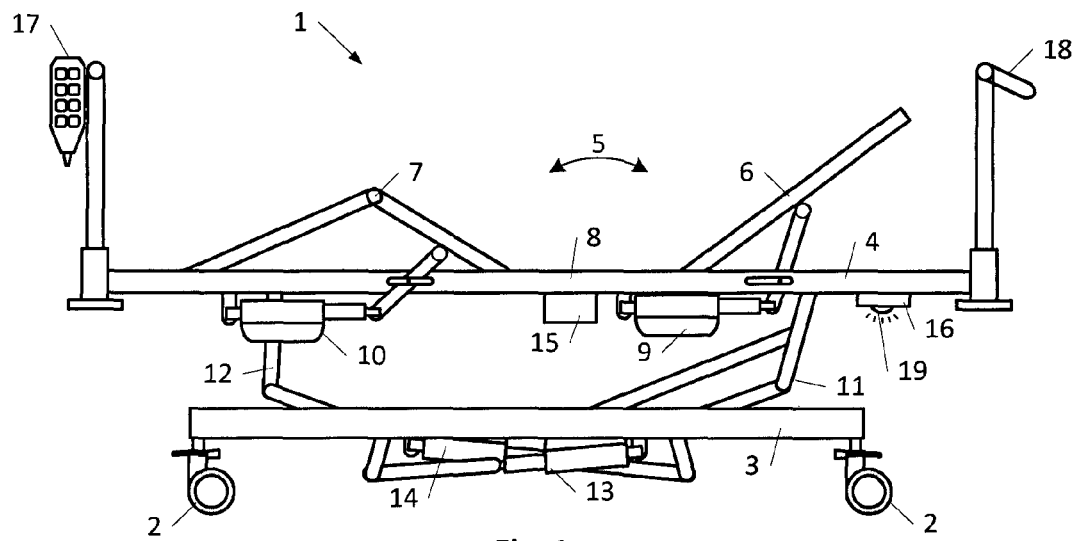
FIG. 1 shows a schematic view of a hospital or care bed comprising an actuator system in a first embodiment.

FIG. 1 shows a hospital bed 1 comprising an under frame 3 equipped with drive wheels 2 and an upper frame 4. An adjustable support surface 5 for a mattress (not shown) is mounted to the upper frame 4. The supporting surface comprises a backrest section 6, an articulated leg rest section 7 and a fixed middle section 8 there between. The backrest and leg rest sections 6,7 can be adjusted with an actuator 9, 10 each such that the supporting surface may assume different contours. The upper frame 4 is connected to the under frame 2 with a linkage 11,12 at each end. The upper frame 4 may be raised and lowered by means of a pair of actuators 13,14 connected to the linkages 11,12. All the actuators 9,10,13,14 are connected to a control box 15 comprising a control and a power supply connected to mains. The control box may further comprise a rechargeable battery pack.

A junction box 16 is connected to the control box 15 for connecting one or more control units, such as a hand control 17 and a control panel 18 integrated in the head or foot board and possibly other peripheral equipment. The overall system comprising actuators 9,10,13,14, control box 15 and control units 17,18 is referred to as an actuator system.

Figure 6:
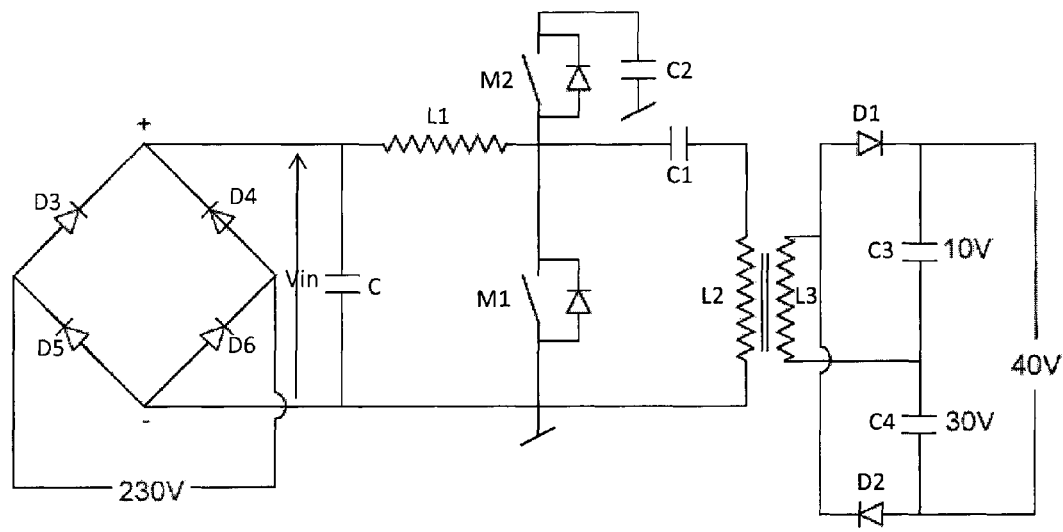
FIG. 6 shows an embodiment of the present invention.
Figure 7:
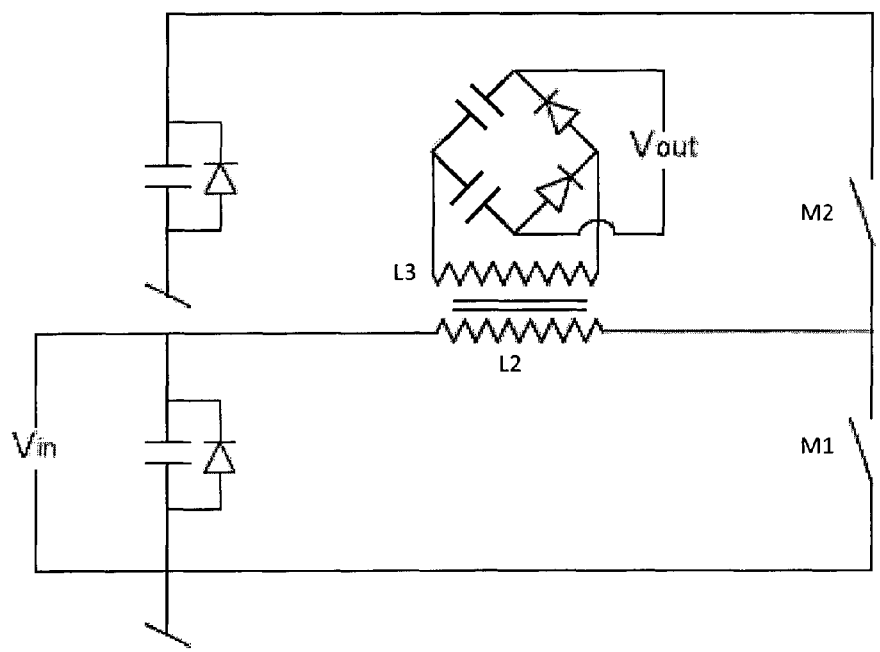
FIG. 7 shows an embodiment of the present invention.
Figure 14:
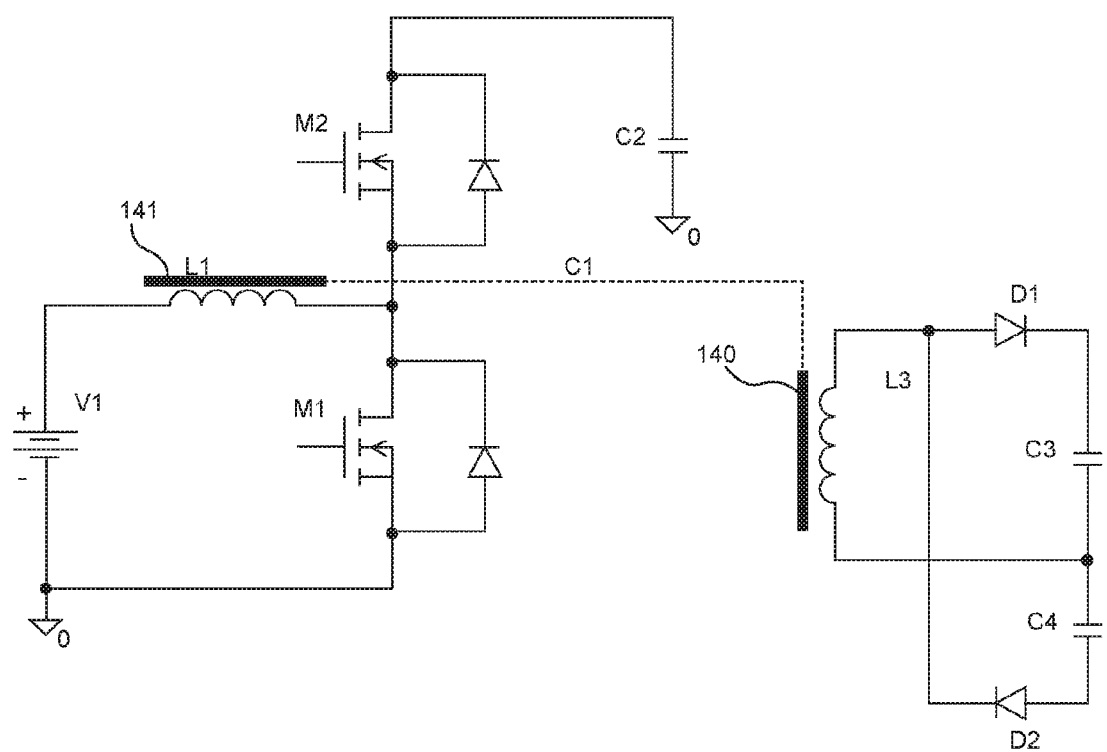
FIG. 14 shows an embodiment of the present invention

In an embodiment the power supply circuit of FIG. 6, 7 or 14 is implemented in the control box 15.

Figure 2:
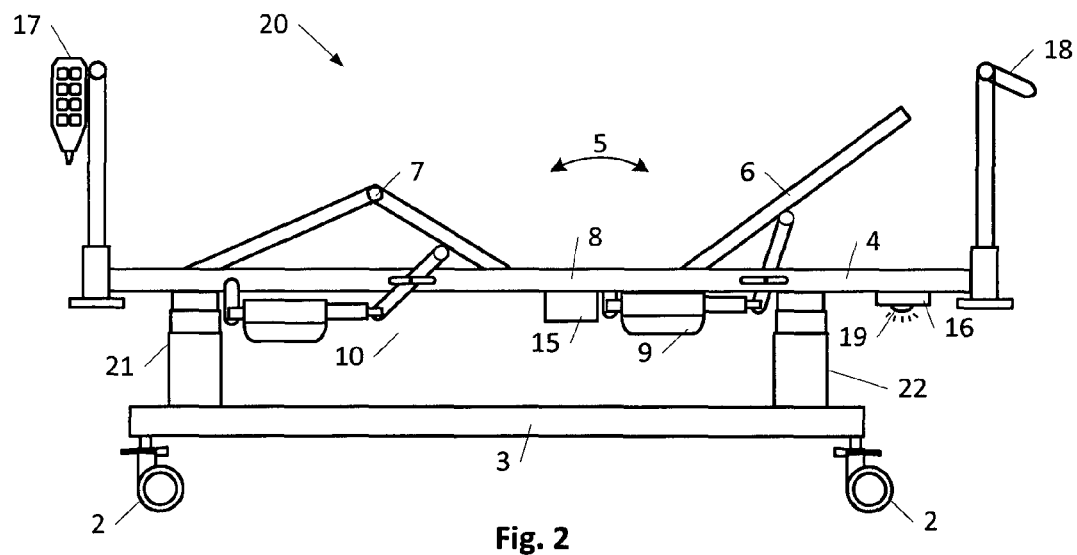
FIG. 2 shows a schematic view of a hospital or care bed comprising an actuator system in a second embodiment.

FIG. 2 shows a schematic view of a hospitals and care bed 20 in another embodiment than the bed shown in FIG. 1. Here, the under frame 3 and the upper frame 4 are not connected by linkages but are instead connected by two linear actuators designed as lifting columns 21,22.

Figure 3:
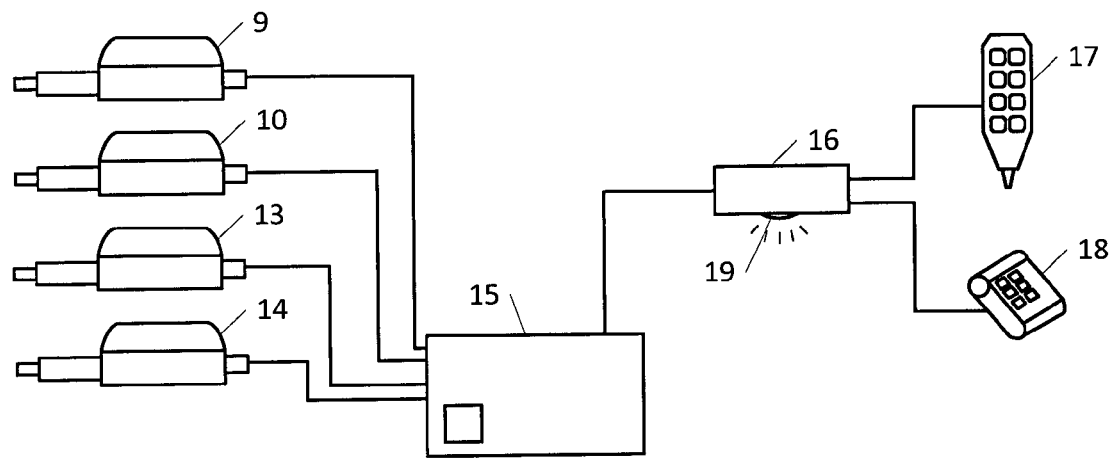
FIG. 3 shows a block diagram of the actuator system in the beds shown in FIGS. 1 and 2.

FIG. 3 shows a block diagram of the actuator system in the beds shown in FIG. 1.

Figure 4:
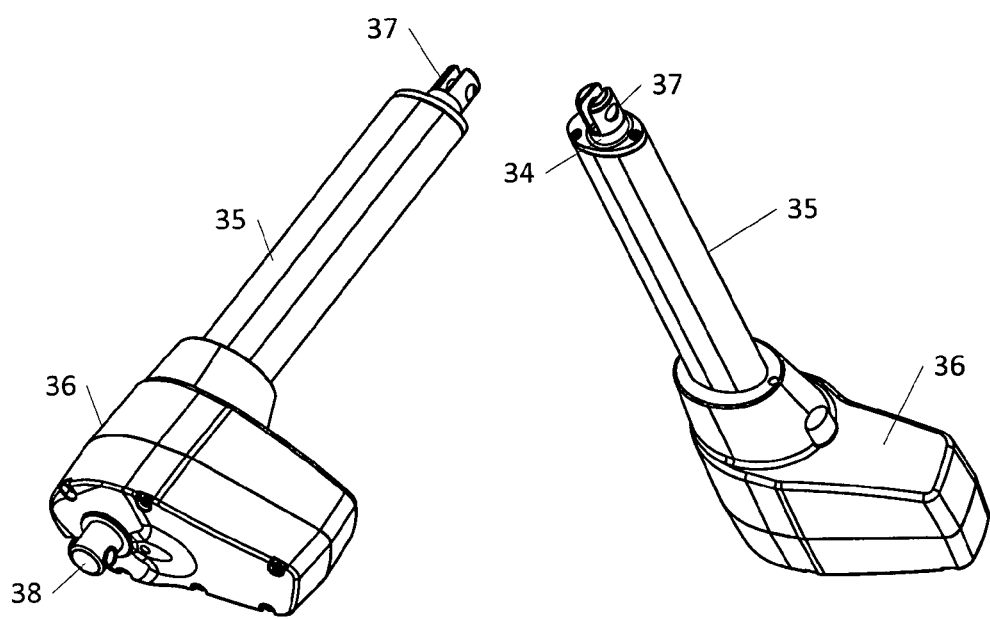
FIG. 4 shows a linear actuator.

FIG. 4 shows a linear actuator 33 of the type comprising a thrust rod and is thus of the same type as the linear actuators 9,10,13,14. The thrust rod is also known as an inner tube 34. The linear actuator comprises an outer tube 35 and a motor housing 36. The linear actuator 33 further comprises a front mounting 37 at the outer end of the inner tube 34 and a rear mounting 38 at the motor housing 36.

Figure 5:
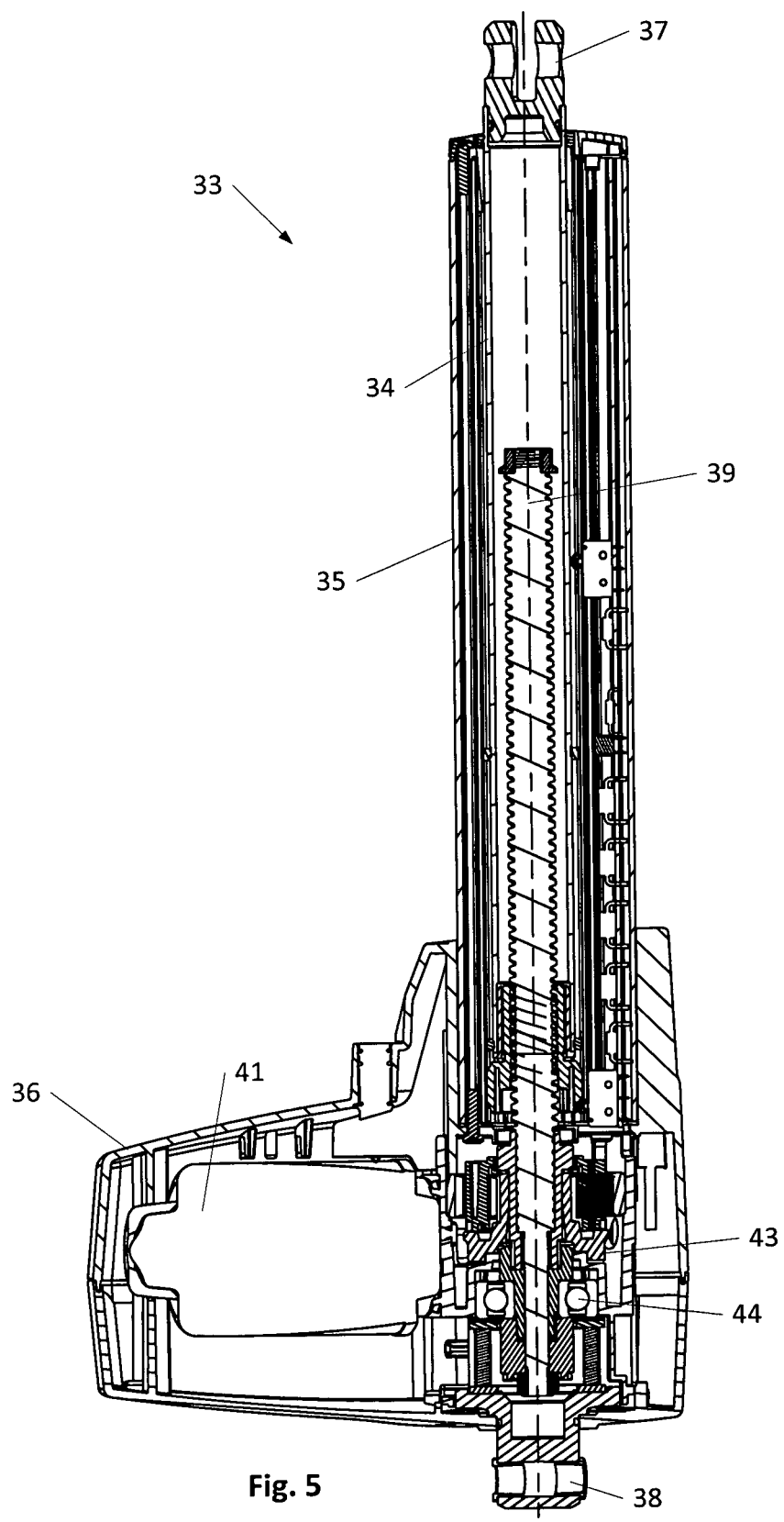
FIG. 5 shows the linear actuator in FIG. 4, where the motor housing and the outer tube has been partially removed.

FIG. 5 shows the linear actuator in FIG. 4, where the motor housing 36 and the outer tube 35 has been partly removed. The main components of the linear actuator 33 are a spindle unit consisting of a spindle 39, on which a spindle nut 40 is arranged. The spindle nut 40 may be secured against rotation. The inner tube 34 is secured to the spindle nut 40 and may thus be moved inwards or outwards on the outer tube 35 depending on the direction of rotation of the spindle 39. The spindle 39 is driven by a reversible electric motor 41 through a transmission. The transmission here comprises a worm 42 located in extension of the drive shaft (not illustrated) of the electric motor and a worm wheel 43 secured to the spindle 39. Moreover, a bearing 44 is secured to the spindle 39. The bearing 44 may e.g. be a ball bearing or a roller bearing.

It is noted that the invention further may be used in connection with so-called dual actuators comprising two spindle units and a control box in one common housing. This type is further described in WO 2007/093181 A1 Linak A/S.

FIG. 6 shows an embodiment of the invention with an AC to DC rectifier bridge comprising D3-D6, the bridge is connected to 230 VAC. Parallel to the DC out is a smoothing capacitor C, with the main function of minimizing the ripple current. The actual power converter consist of an inductor L1, switch elements M1 and M2, the capacitors C1 and C2, a transformer with a primary winding L2 and a secondary winding L3, two diodes D1 and D2. The function of each component and the overall function of the converter will be explained more in detail in the following pages.

The switch elements M1 and M2 each comprises an electronic switch, such as a MOSFET transistor or similar, together with a freewheeling diode in parallel, or a body diode. MOSFET transistors inherently contain a build-in diode, thus the name body diode.

The two switches M1 and M2 operate opposite of each other, whenever M1 is on M2 is off and when M2 is on M1 is off, i.e. they are complementary to each other. Additionally a deadband in the modulation signals between M1 and M2 is implemented, to prevent a situation where both M1 and M2 is on and thus conducting current.

The duty cycle is the time that either switches M1 or M2 spends in an active state as a fraction of the total time under consideration. In an electrical device, a 60% duty cycle means the power is on 60% of a complete time period and off 40% of the complete time period. The "on time" for a 60% duty cycle could be a fraction of a second.

FIG. 7 shows a simplified realization of the converter according to the present invention, where the inductor L1 and the primary winding L2 is the same winding.

Figure 15:
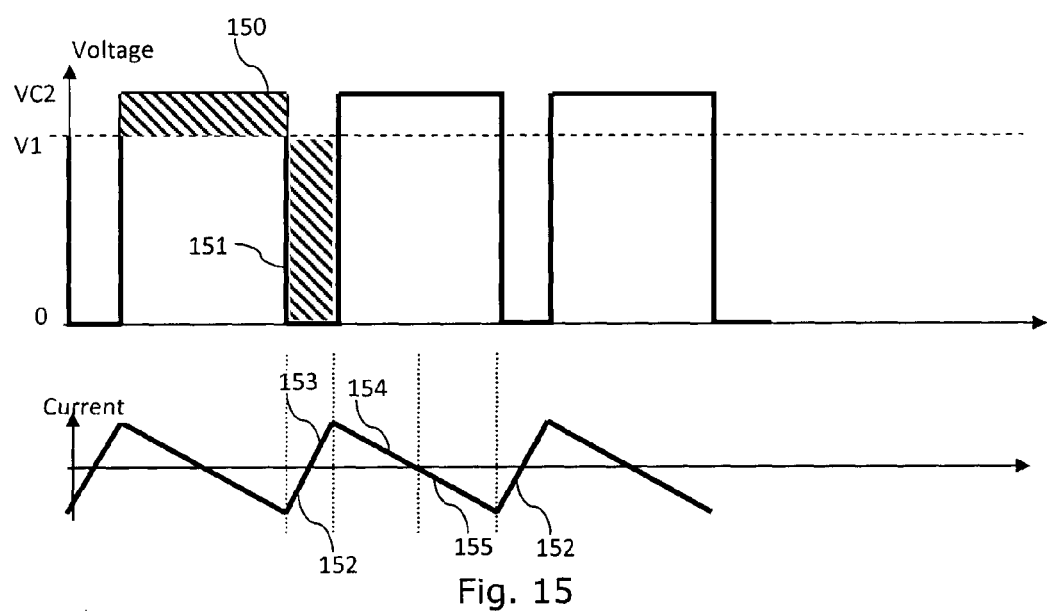
FIG. 15 shows voltage and current curves of an embodiment of the present invention.

FIG. 8 to FIG. 13 shows how the current flows in the various steps of the power conversion, the various steps correspond to the phases 152, 153, 154, 155 in FIG. 15. This will be explained in more detail now.

Figure 8:
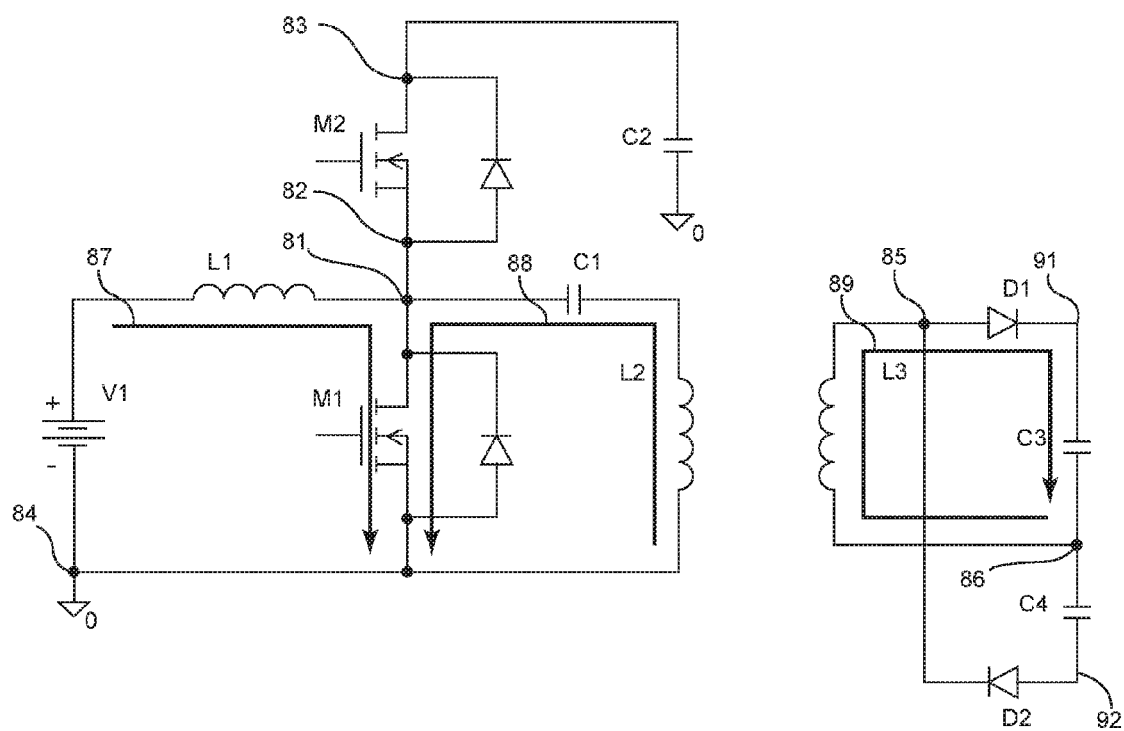
FIG. 8 shows an interval of the switch sequence.

FIG. 8 shows the situation where switch element M1 is on, interval 153 and thus in conduction mode. A positive current 87 will start to flow through the inductor L1, the current 87 will increase as long as M1 is conducting, which is controlled by a duty cycle regulation circuit (not shown here). The voltage source V1 is connected to ground 84. Similar will a current 88 also flow through L2, C1 and M1. As M1 is on the voltage level across M1 is very little, only the voltage drop across to silicon layer is present. Thus the point 81 is almost equal to ground 84. A current 88 flows in L2, therefore a current 89 will also flow in L3, because L2 and L3 are magnetic coupled through a common core. During this interval 153 the capacitor C3 is being charged.

The secondary side of the circuit comprises L3, D1, D2, C3 and C4. The capacitors C3 and C4 are connected in series between the first output terminal 91 and the second output terminal 92, the common point 86 between the two capacitors C3 and C4 is connected to one side of the inductor L3.

Figure 9:
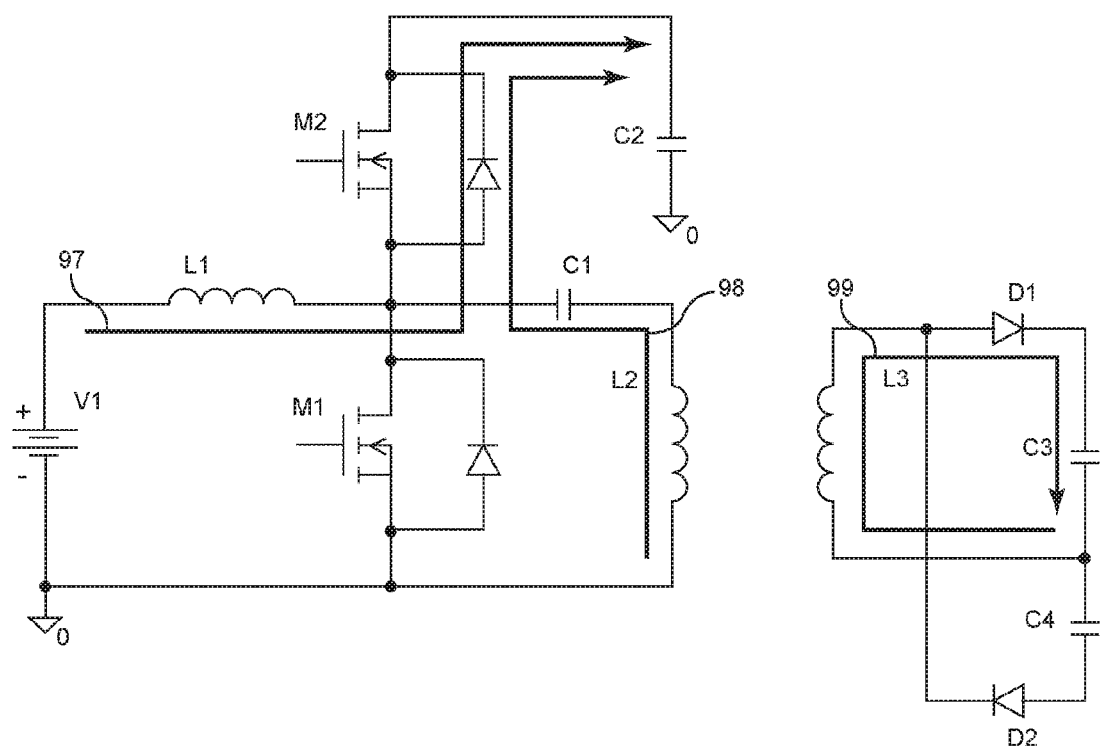
FIG. 9 shows an interval of the switch sequence.

FIG. 9 shows the next interval which is the interval between 153 and 154. This is only the dead time between M1 being turned off until M2 is turned on, meaning that none of the switches are turned on. M1 is blocked so the currents 87 and 88 are forced to commutate through the diode of M2, showed as current 97 and 98. The current 98 has the same direction as current 88, thus current 99, 89 continues to flow.

Figure 10:
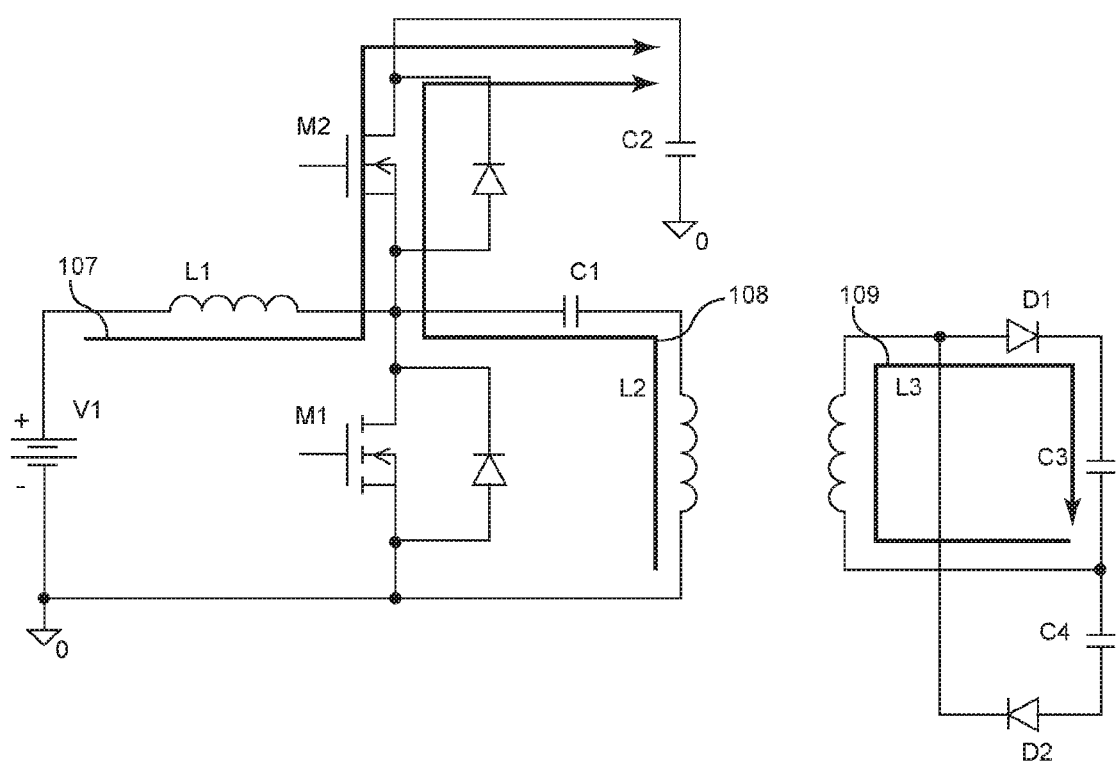
FIG. 10 shows an interval of the switch sequence.

FIG. 10 shows the interval 154 where M2 starts to conduct and the currents 107, 108 both flows through M2 into C2. The direction of current 109 is also unchanged.

Figure 11:
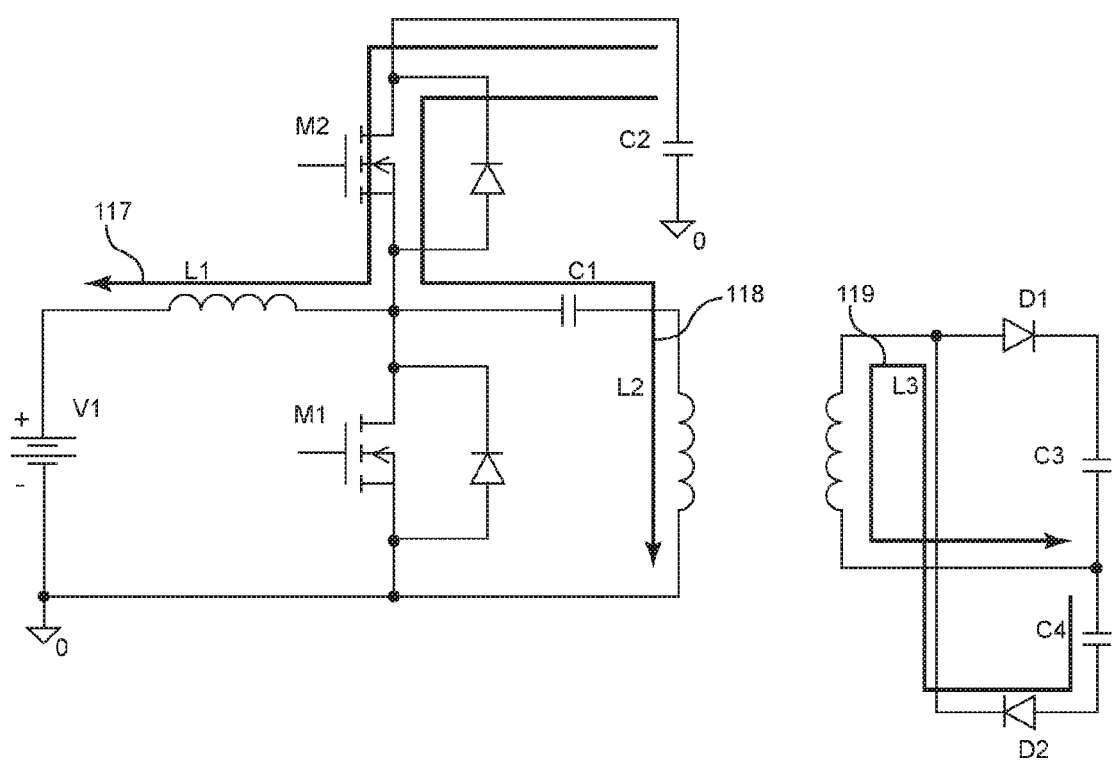
FIG. 11 shows an interval of the switch sequence.

FIG. 11 shows the interval 155 where the sign of the current 117 in the inductor L1 has changed and so has the current 118 in L2, therefore has the direction of the current 119 also changed in the secondary side, thus the capacitor C4 is being charged.

Figure 12:
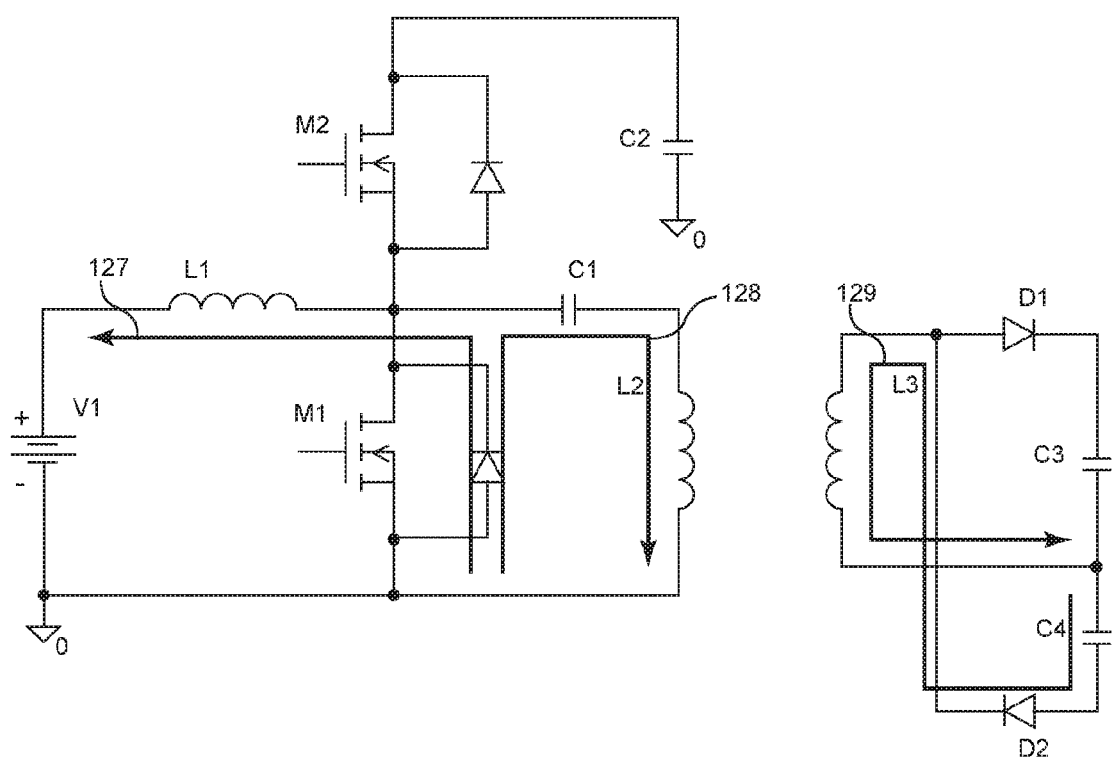
FIG. 12 shows an interval of the switch sequence.

FIG. 12 shows the second dead time transition, where none of the switch elements M1 and M2 are on, thus current 127 and 128 commutates through the body diode of M1. Current 129 still charge C4.

Figure 13:
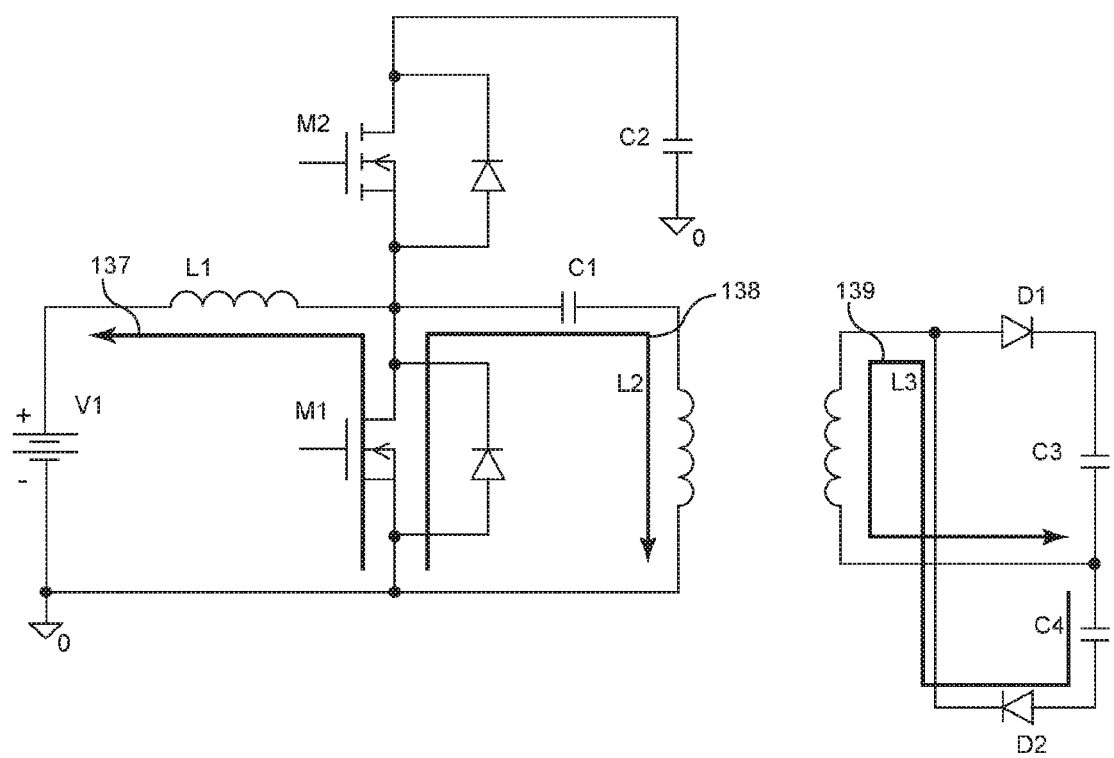
FIG. 13 shows an interval of the switch sequence.

FIG. 13 shows the last step where M1 is on so the negative currents 137, 138 flows through M1 into L1 and L2. Current 139 still charge C4 through D2.

FIG. 14 shows an embodiment of the invention where C1 and L2 is eliminated and the magnetic coupling is between L1 and L3 through magnetic element 140 and 141, the converter of this embodiment work in a similar way, as just explained for FIG. 8-13.

In an embodiment of the circuit of FIG. 14 the transformation ratio between L1 and L3 is 12:1. In other embodiments the ratio can be in the range of 5-30, preferably in the range of 10-20.

FIG. 15 upper part shows the voltage level at point 81. When M1 is on, the voltage is close to zero. The area 151 volt-sec is determined by the duty cycle D and a period, where the switch period is equal to the full cycle 152-155. When M2 is on the voltage commutates to the level of VC2, the area 150 volt-sec is determined by the duty cycle 1-D. The area 150 and 151 are equal, so equilibrium between area 150 and area 151 is achieved. The operation of M1 and M2 generates a switched voltage in the point or node 81 of FIG. 8.

The lower part of FIG. 15 shows the current in the inductor L1, as just explained.

It is important to mention that the voltage in node 81 follows the shape of FIG. 15 upper part, meaning that the output voltage of the secondary side in node 85 also follows the same curve, thus the current through L3 follows the voltage of node 85.

Figure 16:
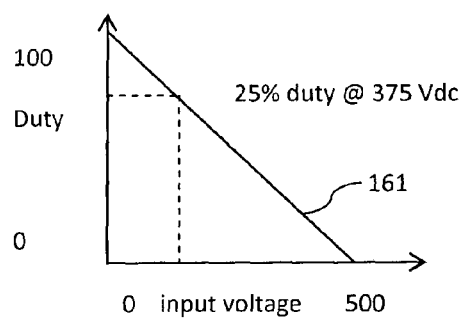
FIG. 16 shows the relationship between input voltage and duty cycle.

FIG. 16 shows the relationship between the duty cycle and the input voltage. As a main objective of this invention is to have a constant output voltage level, while having different input voltage levels, this is due to two main reasons. First: Different parts of the world, has different voltage level for their standard electrical sockets, Europe uses 230V and USA has 110V. Secondly: The electrical grid standards allow fluctuations in the voltage level, as an example, +15% of nominal voltage. So the line 161 shows the fixed voltage output as a function of the input voltage together with the duty cycle. The expression for the transfer function from input to output is:

$$V_{out} = n * V_{in}(1 - duty)$$

where n is the transformation ratio and duty is the duty cycle between 0-100%.

The control runs as feed forward, it is not necessary with a feedback from the secondary side, which allows the control to be a very simple feed forward control (PWM).

In an embodiment with a 50% duty cycle to the amplitude and length of the area 150 and area 151 are equal meaning that the voltage over C3 and C4 are equal.

In an embodiment with a 25% duty cycle, the voltage over C3 may be a third of the voltage over C4.

In an embodiment with a 75% duty cycle, the voltage over C3 may be three times the voltage over C4.

In general the design criteria for universal power supplies is an AC input voltage between 85 VAC to 265 VAC.

In an embodiment the power converter is used as a power supply to a system, wherein a power converter according to the present invention feeds an H-bridge with four electronic switches, wherein an electrical DC motor is connected to midpoint of the H-bridge.

In an embodiment with a DC motor, the voltage at the converter terminals are kept constant or nearly constant, the rotational direction of the DC motor is controlled by operating the four switches in the H-bridge. The rotational speed of the DC motor is controlled by a PWM modulation of the H-bridge.

The power converter of the present invention can be manufactured in many different sizes and power levels. A known range for using the power converter in an embodiment with an actuator system could 200 W-500 W, but the power converter may not be limited to that range.

In most applications the power supplies used in actuator systems are based on a traditional transformer with a rectifier and filter capacitor as mentioned above or a switch mode power supply. However, there are applications, such as wheelchairs where the power supply consists of rechargeable batteries.

In an embodiment a power converter is charging the rechargeable batteries by using the topology of the present invention, like the circuit of FIG. 6, 7 or 14.

Figure 17:
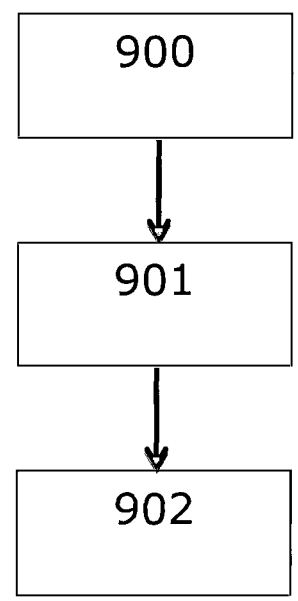
FIG. 17 is a flow-chart of a method according to the invention.

FIG. 17 shows a flow chart of the method of converting power in a power converter from a first voltage level at an input terminal to a second voltage level between a first and a second output terminal according to the present invention, Step 900 is operating a first switch with a first duty cycle (D) and operating a second switch with a second duty cycle (1-D) wherein the first and second switch elements are operated such that their conducting periods are complementary.

Step 901 is generating a switched voltage when current flows in a first inductor, consisting of a first pulse when the first switch element conducts and generating a second pulse when the second switch conducts, Step 902 is transforming the switched voltage through a magnetic coupled circuit with a primary inductor to a secondary inductor and rectifying the first pulse through a first diode and rectifying the second pulse through a second diode.

In summary the invention relates to a power converter for converting power from a first voltage level at an input terminal to a second voltage level across an first and second output terminals, said power converter comprising,
 a first inductor, with one end connected to the input terminal and another end connected to a point with a switched voltage level,
 a first switch element with a first terminal connected to the point and a second terminal connected to ground and
 a second switch element connected in series with a capacitor through a first terminal and a second terminal of the second switch element being connected to the point and said capacitor being terminated to ground,
 wherein the first switch element is arranged for being operated with a first duty cycle (D) and wherein the second switch element is arranged for being operated with a second duty cycle (1-D), wherein the first and second switch elements are arranged to operated such that their conducting periods are complementary, wherein the switched voltage level at the point comprises of a first pulse generated when the first switch element conducts and a second pulse generated when the second switch element conducts.
 a magnetic coupled circuit arranged to transform the switched voltage at the midpoint through a primary inductor to a secondary inductor, a first end of said secondary inductor being connected to a first and second diode with opposite polarity, wherein the first diode is arranged to rectify the first pulse and the second diode is arranged to rectify the second pulse and
 a series connected output capacitor with a common point being connected between the first and second output terminals, the output of the first diode being connected to the first output terminal, the output of the second diode being connected to the second output terminal and the second end of the secondary inductor being connected to the common point.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined and the mentioning of these features in different claims does not exclude that a combination of features is not possible and advantageous.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A power converter for converting power from a first voltage level at an input terminal to a second voltage level between a first and a second output terminal, said power converter comprising,
    a first inductor, with one end connected to the input terminal and another end connected to a point with a switched voltage level,
    a first switch element with a first terminal connected to said point and a second terminal connected to ground and
    a second switch element connected in series with a capacitor through a first terminal and a second terminal of the second switch element being connected to said point and said capacitor being terminated to ground, wherein the first switch element is arranged for being operated with a first duty cycle (D) and wherein the second switch element is arranged for being operated with a second duty cycle (1-D), wherein the first and second switch elements are arranged to operated such that their conducting periods are complementary, wherein the switched voltage level at said point comprises a first pulse generated when the first switch element conducts and a second pulse generated when the second switch element conducts,
    a magnetic coupled circuit arranged to transform the switched voltage at said point through a primary inductor to a secondary inductor, a first end of said secondary inductor being connected to a first and second diode, said diodes having opposite polarity, wherein the first diode is arranged to rectify the first pulse and the second diode is arranged to rectify the second pulse and
    a series connected output capacitor with a common point being connected between the first and second output terminals, the output of the first diode being connected to the first output terminal, the output of the second diode being connected to the second output terminal and the second end of the secondary inductor being connected to said point.

2. The power converter according to claim 1, wherein the voltage level at the output terminals is regulated by adjusting the first and second duty cycles.

3. The power converter according to claim 1, wherein the first and second duty cycles are adjusted according to the first voltage level at the input terminal, so as to keep a constant second voltage level between the output terminals.

4. The power converter according to claim 1, further comprising an AC to DC rectifier and a smoothing capacitor connected to the input terminal.

5. The power converter according to claim 1, wherein the first switch element further comprises a first diode connected in parallel and wherein the second switch element further comprises a second diode connected in parallel.

6. The power converter according to claim 1, wherein the first inductor and the primary inductor are implemented as one common component.

7. The actuator system comprising a power converter according to claim 1.

8. A method of converting power in a power converter from a first voltage level at an input terminal to a second voltage level between a first and a second output terminal, said power converter comprising a first inductor with one end connected to the input terminal and another end connected to a point with a switched voltage level, said method comprising:
    operating a first switch element connected between said point and ground with a first duty cycle (D),
    operating a second switch element connected between said point and a capacitor being terminated to ground with a second duty cycle (1-D), wherein the first and second switch elements are operated such that their conducting periods are complementary, and wherein the first and second duty cycles are adjusted according to the first voltage level at the input terminal, so as to keep a constant second voltage level between the output terminals,
    generating a switched voltage when current flows in the first inductor consisting of a first pulse when the first switch element conducts and generating a second pulse when the second switch element conducts,
    transforming the switched voltage through a magnetic coupled circuit with a primary inductor to a secondary inductor, and
    rectifying the first pulse through a first diode and rectifying the second pulse through a second diode.

* * * * *